UNITED STATES PATENT OFFICE.

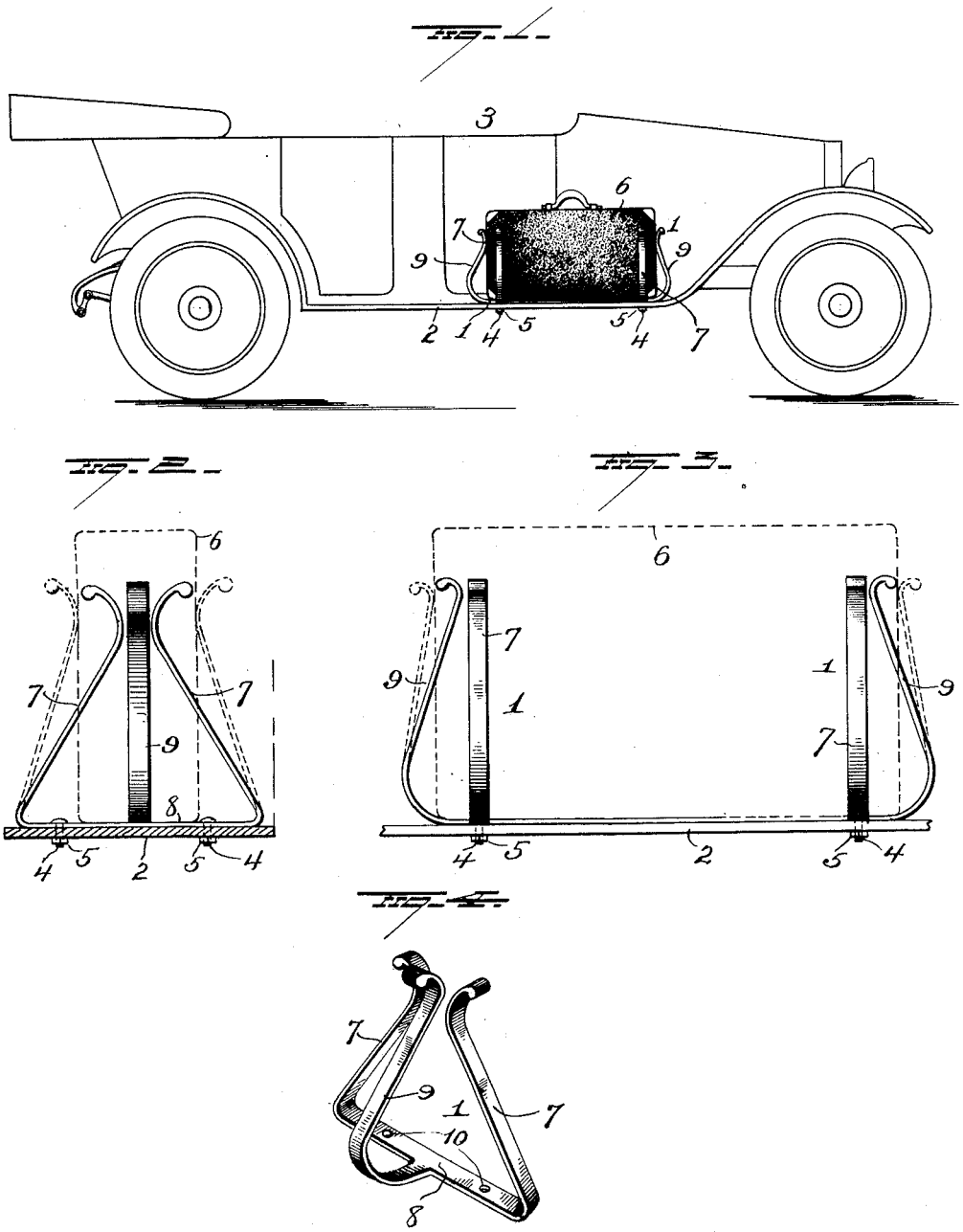

SAMUEL WHEELER WORTHINGTON, OF WILSON, NORTH CAROLINA.

LUGGAGE HOLDER OR CARRIER.

1,356,328.     Specification of Letters Patent.     Patented Oct. 19, 1920.

Application filed November 20, 1919. Serial No. 339,472.

*To all whom it may concern:*

Be it known that I, SAMUEL W. WORTHINGTON, a citizen of the United States, and a resident of Wilson, in the county of Wilson and State of North Carolina, have invented certain new and useful Improvements in Luggage Holders or Carriers, and do hereby declare the following to be a full, clear, and exact description of the invention, such as will enable others skilled in the art to which it appertains to make and use the same.

This invention relates to improvements in luggage holders or carriers, and particularly to such as are adapted for use on automobiles,—the object of the invention being to provide simple and efficient means, attachable to the running board of an automobile for holding luggage, such as suit-cases.

A further object is to so construct luggage carrying means applicable to the running board of an automobile, that the luggage shall be effectually held against displacement during the travel of the automobile, but which will permit the luggage to be readily placed in position, or easily withdrawn from the holding means when desired to remove the same from the car.

With these and other objects in view, the invention consists in certain novel features of construction and combinations of parts as hereinafter set forth and pointed out in the claims.

In the accompanying drawings, Figure 1 is a view showing the application of my improvements to an automobile. Fig. 2 is an enlarged end view of the luggage holding means. Fig. 3 is a side elevation, and Fig. 4 is a perspective view of one of the brackets of the holding means.

My improved luggage carrying or holding means comprises two brackets or members 1, 1, which are secured to the running board 2 of an automobile 3, by means of suitable bolts 4 and nuts 5,—said brackets or members being so spaced apart as to receive luggage such as a suit-case 6 and engage the latter at and near respective ends of the same. Each bracket or member 1 comprises two spring arms 7, 7, projecting upwardly from and preferably integral with respective ends of a base 8, and a spring arm 9 projecting upwardly from an intermediate portion of the base 8 and preferably integral with the same. The base 8 of each bracket or member is provided with holes 10 for the accommodation of the securing bolts 4.

The spring arms 7—9 may be curved and the side arms 7 normally approach each other, while the end arms 9 are so formed that their upper ends will be normally disposed near the upper ends of the side arms 7.

When a suit-case is placed on the running board 2 and within the holding means, the spring arms 7—9 will be forced outwardly and their resilience will cause them to press against the sides and ends of the suit-case and thus hold the latter from displacement during the travel of the automobile, but will permit the ready withdrawal of said suit-case and its removal, when desired.

Having fully described my invention what I claim as new and desire to secure by Letters-Patent, is:

1. Luggage holding means comprising two brackets to be spaced apart and secured to the running-board of an automobile, each of said brackets having two upwardly projecting spring arms to engage the sides of the luggage and an upwardly projecting spring arm to engage an end of the luggage, each of said arms being inclined inwardly.

2. Luggage holding means, comprising two brackets, each bracket comprising a base, spring arms projecting upwardly from respective ends of said base, and a spring arm projecting upwardly from an intermediate portion of said base, said spring arms being inclined inwardly.

In testimony whereof, I have signed this specification in the presence of two subscribing witnesses.

SAMUEL WHEELER WORTHINGTON.

Witnesses:
   E. T. BARNES,
   W. P. ADAMS.